United States Patent
Lin et al.

(10) Patent No.: US 8,145,337 B2
(45) Date of Patent: Mar. 27, 2012

(54) METHODOLOGY TO ENABLE WAFER RESULT PREDICTION OF SEMICONDUCTOR WAFER BATCH PROCESSING EQUIPMENT

(75) Inventors: Chun-Hsien Lin, Hsin-Chu (TW); Amy Wang, Taipei (TW); Francis Ko, Taichung (TW); Jean Wang, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 403 days.

(21) Appl. No.: 11/941,518

(22) Filed: Nov. 16, 2007

(65) Prior Publication Data

US 2008/0275676 A1   Nov. 6, 2008

Related U.S. Application Data

(60) Provisional application No. 60/916,194, filed on May 4, 2007.

(51) Int. Cl.
*G06F 19/00* (2006.01)

(52) U.S. Cl. .......... 700/108; 700/121; 700/28; 700/105; 700/117; 700/109; 700/110; 700/29; 700/30; 438/114; 438/637; 382/144; 382/149; 702/2; 702/127; 702/128; 702/183; 702/35; 430/30; 430/5; 430/945

(58) Field of Classification Search .......... 700/105–121
See application file for complete search history.

(56) References Cited

U.S. PATENT DOCUMENTS

| | | | |
|---|---|---|---|
| 5,048,800 A | 9/1991 | Miyazaki et al. | |
| 5,408,405 A * | 4/1995 | Mozumder et al. | 700/31 |
| 5,440,478 A | 8/1995 | Fisher et al. | |
| 5,847,965 A | 12/1998 | Cheng | |
| 5,963,881 A | 10/1999 | Kahn et al. | |
| 6,028,991 A | 2/2000 | Akashi | |
| 6,045,619 A | 4/2000 | Tai et al. | |
| 6,077,310 A | 6/2000 | Yamamoto et al. | |
| 6,289,257 B1 | 9/2001 | Sekine | |
| 6,408,219 B2 | 6/2002 | Lamey, Jr. et al. | |
| 6,410,351 B1 * | 6/2002 | Bode et al. | 438/14 |
| 6,549,864 B1 | 4/2003 | Potyrailo | |

(Continued)

OTHER PUBLICATIONS

Chang et al, "Virtual Metrology Technique for semiconductor Manufacturing", Jul. 2006, International Joint Conference on Neural Networks, pp. 5289-5293.*

(Continued)

*Primary Examiner* — Albert Decady
*Assistant Examiner* — Olvin Lopez Alvarez
(74) *Attorney, Agent, or Firm* — Haynes and Boone, LLP

(57) ABSTRACT

A method to enable wafer result prediction from a batch processing tool, includes collecting manufacturing data from a batch of wafers processed in batch in the batch processing tool, to form a batch processing result; defining a degree of freedom of the batch processing result based on the manufacturing data; and performing an optimal curve fitting by trial and error for an optimal function model of the batch processing result based on the batch processing result.

20 Claims, 4 Drawing Sheets

U.S. PATENT DOCUMENTS

| | | | | |
|---|---|---|---|---|
| 6,616,759 | B2* | 9/2003 | Tanaka et al. | 118/63 |
| 6,810,296 | B2 | 10/2004 | Bode et al. | |
| 6,917,849 | B1* | 7/2005 | Pasadyn et al. | 700/121 |
| 6,968,253 | B2 | 11/2005 | Mack et al. | |
| 6,980,873 | B2 | 12/2005 | Shen | |
| 6,988,017 | B2* | 1/2006 | Pasadyn et al. | 700/121 |
| 7,139,620 | B2* | 11/2006 | Yamazaki et al. | 700/44 |
| 7,144,297 | B2* | 12/2006 | Lin et al. | 451/5 |
| 7,325,225 | B2* | 1/2008 | Tanaka et al. | 716/53 |
| 7,326,848 | B2* | 2/2008 | Weare et al. | 84/668 |
| 7,359,759 | B2* | 4/2008 | Cheng et al. | 700/121 |
| 7,360,191 | B2 | 4/2008 | Chang et al. | |
| 7,363,207 | B2 | 4/2008 | Kamon | |
| 7,502,709 | B2* | 3/2009 | Funk et al. | 702/127 |
| 7,519,885 | B2* | 4/2009 | Kaushal et al. | 714/733 |
| 7,531,368 | B2* | 5/2009 | Winkler et al. | 438/5 |
| 7,738,978 | B2* | 6/2010 | Singh et al. | 700/83 |
| 7,751,921 | B2* | 7/2010 | Sakamoto et al. | 700/108 |
| 2004/0029299 | A1 | 2/2004 | Pasadyn et al. | |
| 2004/0040001 | A1* | 2/2004 | Miller et al. | 716/4 |
| 2004/0059456 | A1* | 3/2004 | Bode et al. | 700/121 |
| 2004/0093107 | A1* | 5/2004 | Good et al. | 700/108 |
| 2004/0181299 | A1* | 9/2004 | Yamazaki et al. | 700/44 |
| 2005/0007577 | A1 | 1/2005 | Engelhard et al. | |
| 2005/0008227 | A1 | 1/2005 | Duan et al. | |
| 2005/0021272 | A1* | 1/2005 | Jenkins et al. | 702/105 |
| 2005/0044514 | A1 | 2/2005 | Wu et al. | |
| 2005/0120328 | A1 | 6/2005 | Seltmann et al. | |
| 2005/0132306 | A1 | 6/2005 | Smith et al. | |
| 2005/0188338 | A1 | 8/2005 | Kroyan et al. | |
| 2005/0209820 | A1 | 9/2005 | Inoue et al. | |
| 2005/0288812 | A1* | 12/2005 | Cheng et al. | 700/109 |
| 2006/0026539 | A1 | 2/2006 | Tetelbaum et al. | |
| 2006/0048010 | A1 | 3/2006 | Tai et al. | |
| 2006/0111804 | A1 | 5/2006 | Lin | |
| 2006/0123380 | A1 | 6/2006 | Ikeuchi | |
| 2006/0184264 | A1* | 8/2006 | Willis et al. | 700/108 |
| 2006/0190876 | A1 | 8/2006 | Yamada | |
| 2006/0282189 | A1 | 12/2006 | Akisawa et al. | |
| 2007/0055892 | A1 | 3/2007 | Pikus | |
| 2007/0101305 | A1 | 5/2007 | Smith et al. | |
| 2007/0201442 | A1 | 8/2007 | Hekmatpour et al. | |
| 2007/0215574 | A1* | 9/2007 | Tanaka | 216/59 |
| 2007/0234246 | A1 | 10/2007 | Sinha et al. | |
| 2007/0265725 | A1 | 11/2007 | Liu et al. | |
| 2007/0266356 | A1 | 11/2007 | Chang et al. | |
| 2007/0266362 | A1 | 11/2007 | Lai et al. | |
| 2007/0277134 | A1 | 11/2007 | Zhang et al. | |
| 2007/0288219 | A1 | 12/2007 | Zafar et al. | |
| 2008/0243289 | A1* | 10/2008 | Yelchuru et al. | 700/109 |
| 2008/0277659 | A1* | 11/2008 | Hsu et al. | 257/48 |
| 2009/0070725 | A1 | 3/2009 | Yamada | |
| 2009/0087756 | A1* | 4/2009 | Schulz | 430/5 |
| 2009/0199151 | A1 | 8/2009 | Banerjee et al. | |

OTHER PUBLICATIONS

Lin et a, "A virtual Metrology Scheme for predicting CVD thickness in semiconductor Manufcaturing", May 2006, IEEE, pp. 1054-1059.*

Huang et al, Importance of Data Quality in Virtual Metrology, Nov. 2006, IEEE, pp. 3727-3732.*

Wikipedia, "degrees of Freedom", Nov. 2011, pp. 7.*

Wise et al, "Application of PARAFAC2 to fault detection and diagnosis in semiconductor etch", Feb. 2001, Journal of Cemometrics, pp. 285-298.*

Cherry et al, "Multiblock Principal Component Analysis based on an combined Index for Semiconductor Fault Detection and Diagnosis", May 2006, IEEE, pp. 159-172.*

U.S. Appl. No. 12/025,933, filed Feb. 5, 2008 by Francis Ko, Chih-Wei Lai, Kewei Zuo, Henry Lo, Jean Wang, Ping-hsu Chen, Chun-Hsien Lin, and Chen-Hua yu for "Novel Methodology to Realize Automatic Virtual metrology," 23 pages.

Ottesen, Craig, "Front Opening Pod (FOUP) Fire Protection: A General Overview," International Sematech, Nov. 5, 1999, 10 pages.

Chen, Kuah-Chou, et al., "Integrated Circuits Industry/Front-Opening Unified Pod Auto-Loading Structure," Knowledge Bridge, No. 22, Apr. 2002, 4 pages.

Chappell, Jeff, "The Future is the FOUP—company Business and Marking," Electronic News, Jul. 17, 2000, 2 pages.

Ouyang, Charles, et al., "An Analytical Model of Multiple ILD thickness Variation induced by Interaction of Layout Pattern and CMP Process," IEEE Transactions on Semiconductor Manufacturing, Aug. 2000, 7 pages.

Raghvendra, Srinivas, et al., "DFM: Linking Design and Manufacturing," Proceedings of the 18th International conference on VLSI Design held jointly with 4th International Conference on Embedded Systems Design, VLSID, 2005, 4 pages.

Tsuijikawa, Hiroyuki, et al., "Power=Supply Noise Reduction with Design for Manufacturability," IEICE Trans Fundamentals, vol. E88-A, No. 12, Dec. 2005, 8 pages.

Yue, H. H., et al., "Fault Detection of Plasma Etchers using Optical Emission Spectra," Aug. 2000, IEEE Transactions on Semiconductor Manufacturing, vol. 13, Issue 3, 12 pages.

Huang, Yi-Ting, et al., "Importance of Data Quality in Virtual metrology," IEEE Industrial Electronics, IECON 2006, 32nd Annual Conference, Nov. 6-10, 2006, 6 pages.

Chang, Yaw-Jen, et al., "Virtual Metrology Technique for Semiconductor Manufacturing," Neural Networks, 2006, IJCNN '06, International Joint conference Jul. 16-21, 2006, 5 pages.

Lin, Tung-Ho, et al., "A Virtual Metrology Scheme for Predicting CVD Thickness in Semiconductor Manufacturing," Robotics and Automation, ICRA Proceedings 2006, IEEE International Conference May 15-19, 2006, 6 pages.

* cited by examiner

METHODOLOGY TO ENABLE WAFER RESULT PREDICTION OF SEMICONDUCTOR WAFER BATCH PROCESSING EQUIPMENT

CROSS-REFERENCE

This application claims the benefit of U.S. Provisional Application 60/916,194 entitled "Method and Apparatus to Enable Accurate Wafer Prediction" filed May 4, 2007, incorporated herein by reference in its entirety.

BACKGROUND

Semiconductor integrated circuits wafers are produced by a plurality of processes in a wafer fabrication facility (fab). These processes, and associated fabrication tools, may include thermal oxidation, diffusion, ion implantation, RTP (rapid thermal processing), CVD (chemical vapor deposition), PVD (physical vapor deposition), epitaxy, etch, and photolithography. During the fabrication stages, products (e.g., semiconductor wafers) are monitored and controlled for quality and yield using metrology tools. As integrated circuits feature sizes are reduced, the amount of monitoring and controlling may need to be increased. This, however, increases costs by the increased quantity of metrology tools required, the increased manpower to perform the monitoring and controlling, and the associated delay in manufacturing cycle time.

Accordingly, a virtual metrology model is utilized for the production control and other purposes with reduced cost. However, the existing virtual metrology model is designed for and can only predict wafer result for single wafer processing tools. A batch of wafers processed in a batch processing tool cannot be properly predicted for their wafer results. For example, a thermal processing chamber may include a vertical furnace to hold and process a batch of wafers positioned in various vertical positions. Usually, the furnace has a thermal field depending on the location of the vertical level. Each of the batch wafers in the batch processing tool may experience a particular processing environment. The associated wafer result variations cannot be predicted by the existing method and the existing virtual metrology model.

Therefore, what is needed is a system and method for increasing the monitoring, controlling, and/or otherwise predicting a quality and/or yield of products manufactured by a batch processing tool.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
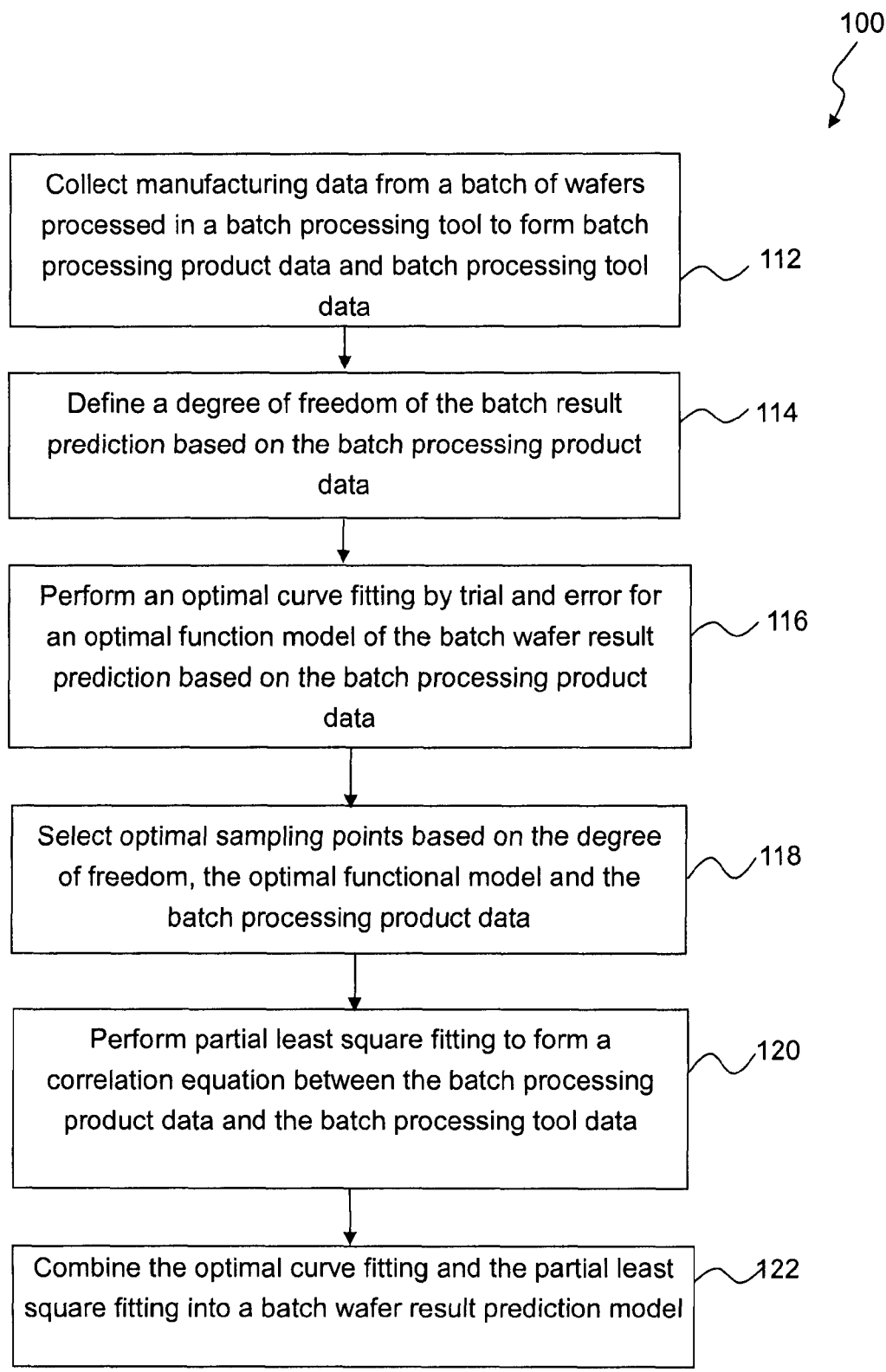
FIG. 1 is a simplified flowchart of one embodiment of a method of enabling batch wafer prediction.

It is to be understood that the following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. A novel method to enable wafer result prediction of batch processing tools is provided and described below with various examples, embodiments, variations, and descriptions.

Figure 4:
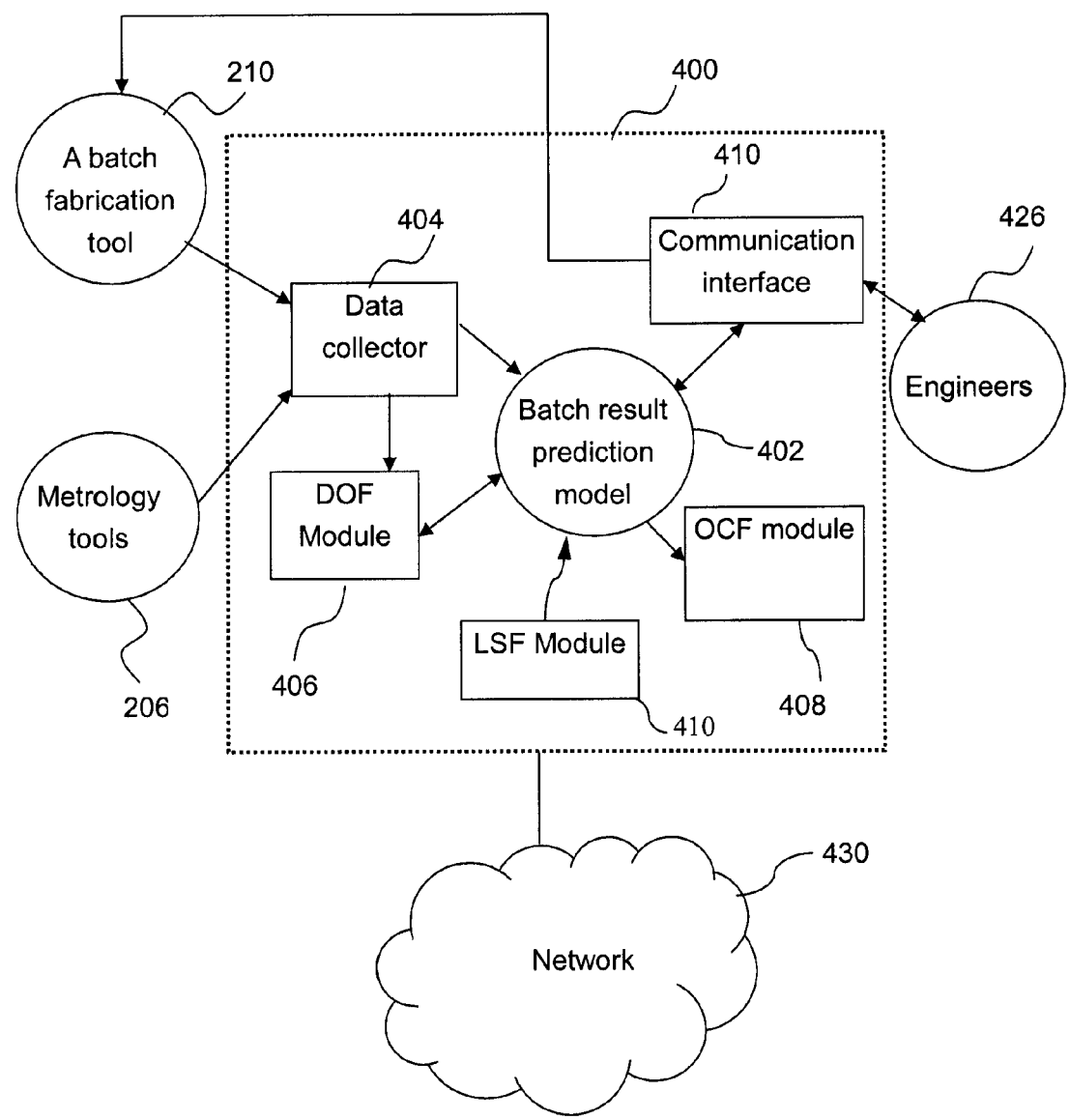
FIG. 4 is a block diagram of one embodiment of a virtual sensor system to implement the method of FIG. 1.

FIG. 1 is a simplified flowchart of a method 100 of enabling batch wafer prediction. Illustrated in FIG. 4 is a block diagram of one embodiment of a virtual metrology system (or soft sensor system) 400 to implement the method 100. The present disclosure provides a method and a system to predict batch wafer result from batch fabrication tool data (or tool data). The method 100 and the system 400 are described below, with reference to FIGS. 1 and 4.

Figure 2:
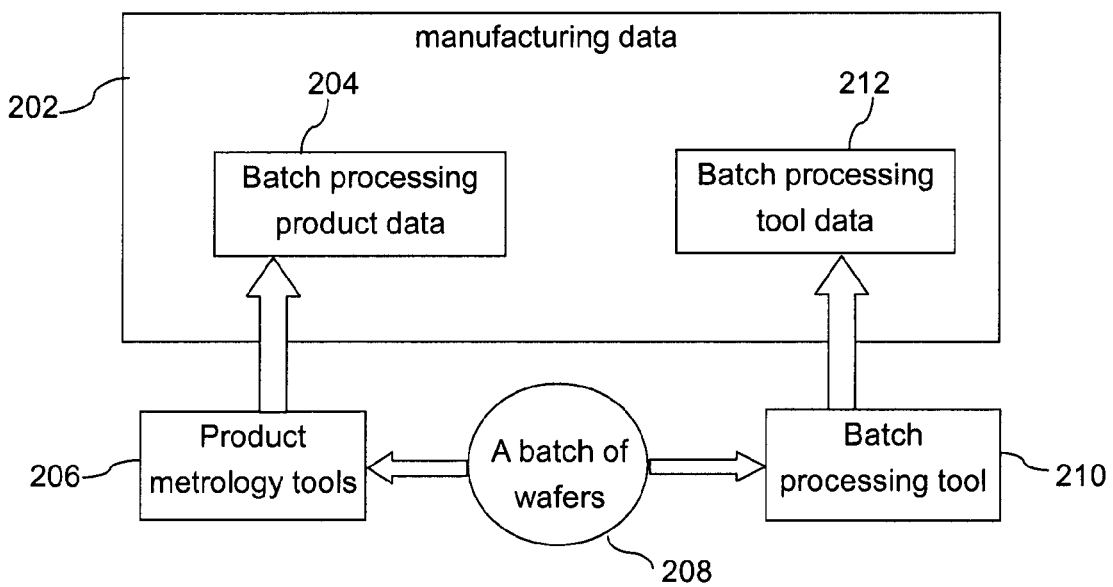
FIG. 2 is a block diagram of one embodiment of manufacturing data constructed according to aspects of the present disclosure.

The method 100 begins at step 112 by collecting manufacturing data. As illustrated in FIG. 2 as a block diagram of the manufacturing data 202 in one embodiment, the manufacturing data 202 include batch processing product data 204 (or batch processing wafer data), collected from one or more metrology tool 206. The batch processing product data 204 include test and measurement results of a batch of wafers 208 after having been processed by a batch processing tool (or batch fabrication tool) 210. For example, the batch processing product data may be measured values of a product parameter (or wafer parameter) such as thickness, reflectivity, or conductivity of a material layer formed by the batch processing tool. In one example, the batch processing product data 202 include inline test result from test structures formed on the subscribe lines of the batch of wafers 208. In another example, the batch processing product data 202 include final test result after the completeness of wafer fabrication to the batch of wafers 208.

The manufacturing data 202 also include batch processing tool data 212 collected from the batch processing tool 210. The batch processing tool data 212 are associated with hardware parameters. In one example, the hardware parameter include active parameters such as power, gas flow, and/or processing duration. The hardware parameter may additionally or alternatively include passive parameters such as temperature, reflectivity, and/or deposition rate, as examples. The batch processing tool data 212 include at least a subset of measured and tested data associated with the hardware parameters of the batch processing tool. The procedure of collecting manufacturing data may be performed by a data collector module 404.

The batch processing tool 210 is a processing tool designed and configured for processing a plurality of products such as a plurality of semiconductor wafers in batch. The batch processing tool 210 may be, for example, a chemical vapor deposition (CVD) system, an etching system, a thermal oxidation system, an ion implantation system, a rapid thermal annealing (RTA) system, or one of other semiconductor fabrication tools designed for batch processing.

Figure 3:
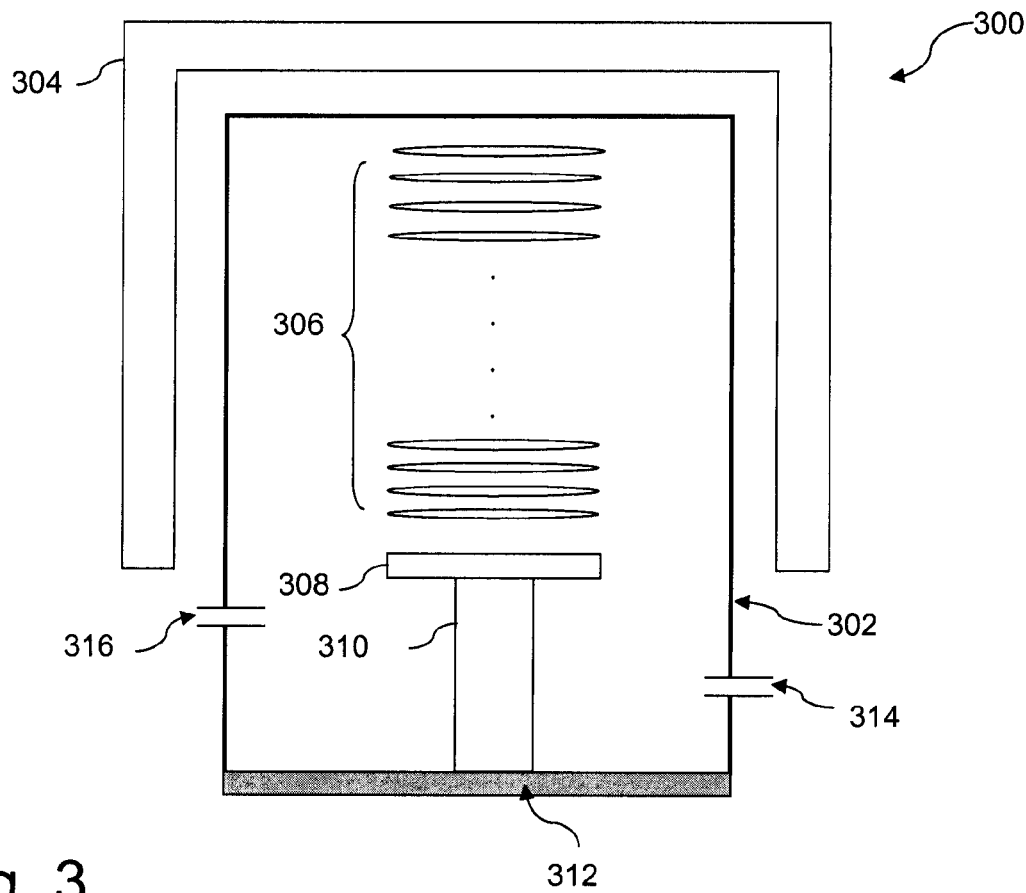
FIG. 3 is a schematic view of one embodiment of a batch process furnace.

As one example, illustrated in FIG. 3 is a schematic view of a thermal furnace 300 designed for silicon nitride deposition, also referred to as silicon nitride furnace. The thermal furnace 300 includes a tube 302, configured vertically and further configured in single layer or double layers. The thermal furnace 300 includes a heater 304 configured around the tube 302 to heat and maintain the tube 302 at a higher temperature proper for silicon nitride deposition. The tube is designed such that a batch of wafers 306 can be positioned and processed therein for silicon nitride deposition. In one example, a batch of products 306 to be processed in the thermal furnace 300 includes 50 wafers. The batch of wafers 306 can be secured in a wafer support such as a wafer boat 308. Additional structures 310, including but not limited to an insulating unit, are configured in the tube 302 for thermal insulation and are approximate the wafer boat 308. A table 312 is coupled with the tube 302 and is configured for sealing the inner tube from the outside environment and other functions such as supporting the insulating unit. The thermal furnace 300 further includes a gas inlet 314 configured to provide proper gases such as reaction gases $SiH_2Cl_2$ and $NH_3$ for silicon nitride formation. The thermal furnace 300 also includes a gas outlet 316 for exhaust gas. In this example, the active parameters may include parameter in a process recipe such as heater power, gas partial pressures, and deposition duration. The passive hardware parameters may include other parameters not included in a process recipe such as wafer temperature and chamber contamination. The batch processing tool data may further include other data such as tool ID, tool maintenance history, and gas specification. When one batch of wafers 306 (such as 50 wafers) are positioned in the tube 302 for silicon nitride deposition, each wafer is located in a particular position. Practically, temperature inside the tube is not uniform and has a space-dependent distribution to from a thermal field. Furthermore, other parameters, such as a reaction gas partial pressure/gas flow, inside the tube may also not uniform. The silicon nitride deposition rate can depend on wafer temperature and other parameters. Accordingly, the deposition rate will depend on a particular location of each wafer in the batch. Therefore, the existing wafer result prediction model for single wafer cannot provide proper results for wafers processed in a batch processing tool. The disclosed invention provides a method to generate a batch wafer result prediction model for predicting batch wafer result based on the batch processing tool data.

The metrology tools 206 may include electrical, optical, and/or analytical tools, such as microscopes, micro-analytical tools, line width measurement tools, mask and reticle defects tools, particle distribution tools, surface analysis tools, stress analysis tools, resistivity and contact resistance measurement tools, mobility and carrier concentration measurement tools, junction depth measurement tools, film thickness measurement tools, gates oxide integrity test tools, C—V measurement tools, focused ion beam (FIB), and other test and measurement tools. The wafer data may include wafer results such as wafer parameters measured by the metrology tools. The wafer parameters may include sheet resistance, reflectivity, stress, particle density, and critical dimension, to name a few. The wafer data may further include other data such as wafer ID and product type.

As an example, a plurality of products (semiconductor wafers), in batch or separately, are processed through various process steps. One process step may be performed in the batch processing fabrication tool 210 in batch mode. Other process steps may be performed in other proper fabrication tools. The batch fabrication tool 210 may be programmed, set, and configured according to a process recipe when the batch of wafers are processed therein. The process recipe may define a plurality of sub-steps. For example, a thermal furnace recipe may define following sub-steps: ramp, deposition, and pump-down. Each sub-step may be defined with a certain time duration and may set various hardware parameters to certain levels, respectively. After the batch of wafers have completed the batch processing in the batch fabrication tool 210 according to the process recipe, one or more of the metrology tools may be utilized to test and measure the batch wafers for batch processing product data. The batch processing tool data are collected from the batch fabrication tool 210 as well. The manufacturing data, including batch processing wafer data and batch processing tool data, may be collected by a data collector 404 from the metrology tools 206 and the batch processing tool 210, respectively.

The method 100 proceeds to step 114 to define a degree of freedom (DOF) for the batch of wafers. The thermal furnace 300 is used as an example of the batch processing tool. The processing result of 50 wafers processed in the thermal furnace in batch are correlated. According to the present method, it is not necessary to measure every wafer in the batch to know the processing result of 50 wafers in the batch. For example, measuring the 4th, 14th, and 27th wafers' thicknesses may provide enough information to predict the film thicknesses of the rest wafers in the batch. In this particular case, the degree of freedom to the batch of wafers associated with the thermal furnace 300 as the batch processing tool is 3. Therefore, an optimal function model to simulate a distribution of a wafer parameter (e.g. silicon nitride film thickness) over the batch of wafers processed in the batch processing tool 210 may need at least three measurements. In this example, the optimal function model includes three parameters to be determined by at least three measurements. One proper procedure to define DOF includes utilizing a method to find eigenvalues and eigenfunctions of a wafer parameter matrix. For example, multiple batch of wafers processed in the batch processing tool 210 (e.g. thermal furnace 300) are measured by one or more of the metrology tools 206 for the batch processing product data of a wafer parameter (e.g. silicon nitride film thickness). The batch processing product data form a wafer parameter matrix associated with the wafer parameter (e.g. silicon nitride film thickness). For example, the measured results of the wafer parameter for each batch of wafers represent a row of the wafer parameter matrix. The measure results of the multiple batches constitute the wafer parameter matrix. The method of calculating eigenvalues, eigenfunctions and DOF of a matrix is known in the art and can be applied to the wafer parameter matrix. The DOF is defined in this procedure. The DOF defining procedure at this step can be implemented by a DOF module 406 using an algorithm designed for executing the above calculation.

The method 100 proceeds to step 116 to perform an optimal curve fitting by trial and error to generate an optimal function model for batch wafer result prediction based on the batch processing product data. At this step, the optimal function model is constructed to describe wafer results of wafers processed in the batch processing tool as a function of wafer location. For example, if the batch processing tool 210 is a thermal furnace, the optimal function model may be constructed to predict thickness of the silicon nitride film formed by the thermal furnace. The optimal function model includes pitch as the variable and other parameters determined by the batch processing product data. The pitch is defined as a sequential location number of a wafer in the batch of wafers processed in the batch processing tool 210. In one embodiment, a function model may be constructed as $$Y = a + b*(e^{-0.7x}) + c*(x^4) \qquad (1)$$

where Y is the silicon nitride film thickness; x is the pitch; a, b and c are parameters to be determined (by the batch processing product data). The number of parameters in the model is associated with the degree of freedom defined above. In one example, the parameters a, b and c are determined by an optimal curve fitting method such as a least square fitting technique. The form of the function model can be a polynomial function or other proper form based on the batch processing product data distribution profile. The form of the function model can be automatically generated by a algorithm based on the measured wafer results and/or further interaction with engineer's input associated with engineer's knowledge and experience. The function model may include a piecewise function. For example, the first piece valid for a range from the first pitch to the $25^{th}$ pitch may be simulated by a polynomial function and the second piece from the $26^{th}$ pitch to the $50^{th}$ pitch may be simulated by a different function including an exponential term such as the equation (1). After one or more batch of wafers have been measured for silicon nitride film thicknesses at step 112 to collect the manufacturing data. The measured results are used to determine the parameters a, b and c, and also the correlation coefficient R of the proposed function model by the least square fitting method. If the correlation coefficient R is equal or greater than a certain criteria such as 0.9, then the proposed equation model is considered to be optimized. Otherwise, this procedure will be repeated with other trial function until an optimal function model is formed. Therefore, this method is also referred to as trail and error method. The optimal curve fitting procedure at this step can be implemented by an optimal curve fitting (OCF) module 408 of the system 400. The silicon nitride film thickness, the degree of freedom being 3, and the above proposed functions are only used for examples to explain the procedure at this step.

The method 100 proceeds to step 118 to select sampling points based on the degree of freedom and the optimal function model. When the degree of freedom is determined at step 114, a number of proper pitches, according to the degree of freedom, are chosen such that the silicon nitride film thicknesses of wafers at the chosen pitches can be used to predict silicon nitride film thicknesses of wafers at other pitches by the optimal function model. For example, if the degree of freedom is 3, then three pitches are properly chosen. The chosen sampling points may bear most of the silicon nitride film thickness information of the all wafers in the batch. The selection process may utilize a algorithm by trial and error method, and may further involve engineering input. The chosen sampling points can be evaluated by the proper index such as correlation coefficient associated with the optimal function model. When the correlation coefficient is below a certain criteria, the above selection procedure can be repeated until the sampling points are optimized. In one example of the thermal furnace with a batch capacity of 50 wafers and DOF as 3, the optimal sampling points may be 4, 14 and 27 for a particular silicon nitride film thickness distribution.

The method 100 proceeds to step 120 to perform partial least square fitting to form a correlation equation between the batch processing product data 204 and the batch processing tool data 212. After the optimal function model is generated, this procedure will build a quantitative relationship between the batch processing product data 204 and the batch processing tool data 212 such that the wafer results (such as silicon nitride film thickness) is directly predicted from the relevant hardware parameters (or hardware key parameters relevant) of the batch processing tool 210 (such as the thermal furnace 300). In the optimal function model, all the parameters such as those parameters a, b and c in the equation (1) are related to the hardware key parameters including active and/or passive parameters of the batch processing tool 210 and therefore are predictable thereby. The relationship between the batch processing product data 204 and the batch processing tool data 212 can be expressed by various functions. The various functions may be selected for the form and further determined for coefficients by the least square fitting procedure. Thus, the parameters (e.g. a, b and c in the equation 1) of the optimal function model can be expressed as various functions of the hardware key parameters of the batch processing tool and formulated through the least square fitting method. Engineers and/or an algorithm may be involved in selecting and determining the various functions. The above least square fitting method may utilize all available batch processing product data 204 and batch processing tool data 212. Those manufacturing data usually include more than one batch. In one embodiment, the use of the manufacturing data in the least square fitting procedure can be more effective by reducing the data volume, therefore referred to as partial least square fitting. For example, the batch processing product data from more than one batch and associated with the same set of the batch processing tool data may be averaged to reduce the data volume. The partial least square fitting procedure can be implemented by a least square fitting (LSF) module 410 of the system 400.

The method 100 may further proceed to step 122 to combine the optimal curve fitting and the partial least square fitting results to form a single model, referred to as a batch wafer result prediction model 402 as illustrated in FIG. 4. The batch wafer result prediction model 402 includes the optimal function generated by the optimal curve fitting method at step 116. Furthermore, the parameters in the optimal function are expressed as functions of the hardware key parameters of the batch processing tool, determined by the partial least square fitting procedure at step 120. Based on the batch processing tool data from the batch processing tool at the time when the batch of wafers are processed by, the wafer results of the batch of wafers can be predicted by the batch wafer result prediction model.

The method 100 may further proceed to perform wafer result prediction. When a batch result prediction model 402 is created for a batch fabrication tool, a wafer result (a wafer parameter such as film thickness) can be predicted by the model. The prediction procedure may include collecting new batch processing tool data associated with the processed wafers, and calculating values of the wafer parameter using the batch result prediction model 402. The predicted wafer results may be sent out to pertinent owners such as engineers.

In one embodiment, the various steps and procedures of the disclosed method 100 can be implemented in the virtual metrology system 400. The system 400 may further include additional components combined, distributed, and coordinated to be operable to generate the batch (wafer) result prediction model 402 and perform predicting of batch wafer results by the batch result prediction model 402. The batch result prediction model 402 may include a plurality of sub-models associated with a combinations of various product parameters to be predicted (such as film thickness and film reflectivity) and a plurality of batch processing tools (such as a thermal furnace for silicon nitride deposition and another furnace for thermal oxidation). Each sub-model of the batch result prediction model is associated with one product parameter and one batch fabrication tool.

The batch result prediction model 402 can be an adaptive such that it is dynamically maintained to fit to the batch fabrication tool and follow changes of the batch fabrication tool over time. Maintaining the adaptive model may include adjusting the model based on new manufacturing data, which may further include performing the optimal curve fitting and the partial least square fitting based on the manufacturing data. The adaptive model may be evaluated after the associated batch fabrication tool's maintenance, repair, wafer products change, and/or a certain periods of time. The procedure does not necessarily limit to the above described as long as the adaptive model is adjusted timely and properly to reflect changes, shifting and drifting of the batch fabrication tools and/or wafer products.

The virtual metrology system 400 may further include a communication interface 410 to communicate the predicted wafer result among the system 400 and pertinent manufacturing owners/customers. For example, the predicted wafer result may be sent to engineers 426 for evaluation, production monitor, and/or process improvement. In another example, the engineers may provide input in various steps of the method 100, such as involving in optimal sampling points selection and optimal curve fitting process. The engineers 426 may communicate with the system through the communication interface 410. The communication interface may provide an alarm to the engineers when the wafer results are out of a predefined range, has apparent shifting, or has other serious changes. The predicted wafer result may be sent to a data control center such as a manufacturing execution system (MES) system wherein the predicted wafer result is further processed, organized, and distributed for data monitoring, evaluation, analysis, and/or control such as statistical process control (SPC). The predicted wafer result may be sent to the batch processing tool 210 and/or a fabrication tool at a next process step, wherein the process recipe and hardware parameters may be adjusted to compensate for any drifting and/or shifting from the current process step for optimized wafer quality, performance, and yield.

As long as a batch result prediction model is created for one (or more) batch fabrication tool, the maintenance of the model and implementation thereof for batch wafer result prediction need not to be in the order described in the above method 100. The maintenance and implementation of the batch result prediction model may be carried on in parallel. Therefore, the model 402 substantially represents batch wafers processed at the batch fabrication tool.

The system 400 of FIG. 4 serves only as an example to the present disclosure. Each module thereof may include software and/or hardware to implement its functions. For example, the batch result prediction model 402 for the batch fabrication tool may include hardware such as computer and memory for operation and storage. The model may include software for generation and maintenance thereof. The model may further include a database having all batch processing product data and batch processing tool data. Each module may be configured and connected to other modules and other components of the semiconductor manufacturer. The system 400 may be configured and organized in different ways such as with less or more modules without departure from the spirit of the present disclosure. The system 400 may be further connected to a network 430. In one example, the system 400 may be connected to or include as part of a virtual fab of FIG. 5, which will be described later.

Thus, the wafer results can be alternatively predicted by the system 400 using the method 100 other than directly measuring. Based on the batch processing tool data, with limited metrology tools and measurement cost, the batch wafer result can be effectively monitored for enhanced process performance and enhanced wafer yield. The disclosed method and system provide a new approach for batch wafer fabrication monitor and control with enhanced efficiency and reduced cost (including measurement and metrology cost).

Figure 5:
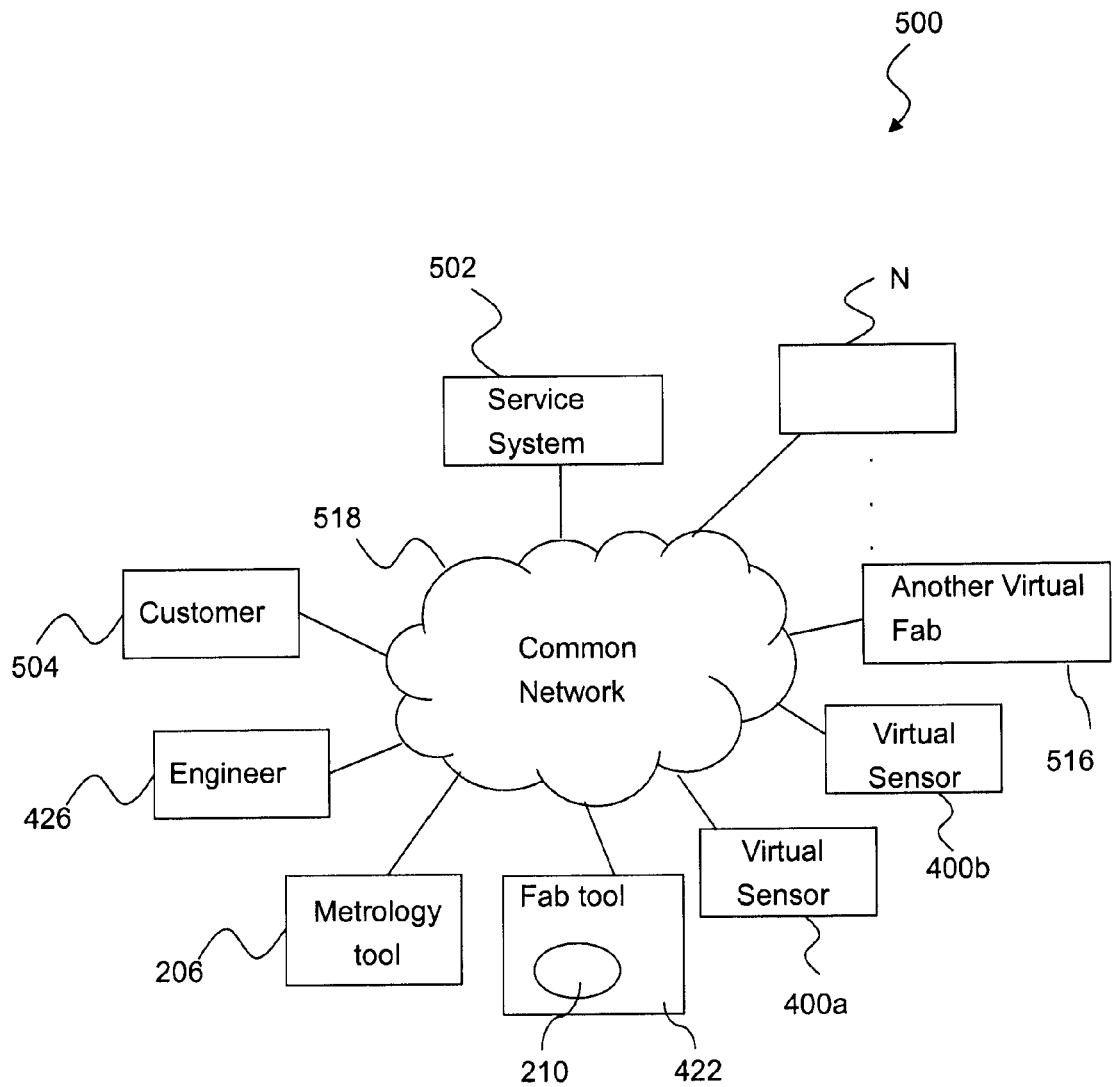
FIG. 5 is a block diagram of a virtual fabrication system, within which the virtual sensor system of FIG. 4 is utilized.

FIG. 5 illustrates a virtual integrated circuit fabrication system (a "virtual fab") 500, to which the system 400 of FIG. 4 may be connected. The virtual fab 500 includes a plurality of entities 502, 504, 426, 206, 422, 400a, 400b, 516 . . . , N that are connected by a communications network 518. The network 518 may be a single network or may be a variety of different networks, such as an intranet and the Internet, and may include both wireline and wireless communication channels.

In the present example, the entity 502 represents a service system for service collaboration and provision, the entity 504 represents a customer, the entity 426 represents an engineer, the entity 206 represents a metrology tool (or facility) for IC testing and measurement, the entity 422 represents fabrication tools including a batch fabrication tool 210, the entity 400a represents a virtual metrology system 400 of FIG. 4 associated with the fabrication tools 422, the entity 400b represents a second virtual metrology system 400 of FIG. 4 (e.g., associated with another batch processing tool which may also be an entity), and the entity 516 represents another virtual fab (e.g., a virtual fab belonging to a subsidiary or a business partner). Each entity may interact with other entities and may provide services to and/or receive services from the other entities.

For purposes of illustration, each entity may be referred to as an internal entity (e.g., an engineer, customer service personnel, an automated system process, a design or fabrication facility, etc.) that forms a portion of the virtual fab 500 or may be referred to as an external entity (e.g., a customer) that interacts with the virtual fab 500. It is understood that the entities may be concentrated at a single location or may be distributed, and that some entities may be incorporated into other entities. In addition, each entity may be associated with system identification information that allows access to information within the system to be controlled based upon authority levels associated with each entities identification information. The virtual fab 500 enables interaction among the entities for the purpose of IC manufacturing, as well as the provision of services. In the present example, IC manufacturing includes receiving a customer's IC order and the associated operations needed to produce the ordered ICs and send them to the customer, such as the design, fabrication, testing, and shipping of the ICs.

One of the services provided by the virtual fab 500 may enable collaboration and information access in such areas as design, engineering, and logistics. For example, in the design area, the customer 504 may be given access to information and tools related to the design of their product via the service system 502. The tools may enable the customer 504 to perform yield enhancement analyses, view layout information, and obtain similar information. In the engineering area, the engineer 426 may collaborate with other engineers using fabrication information regarding pilot yield runs, risk analysis, quality, and reliability. The logistics area may provide the customer 504 with fabrication status, testing results, order handling, and shipping dates. It is understood that these areas are exemplary, and that more or less information may be made available via the virtual fab 500 as desired.

Another service provided by the virtual fab 500 may integrate systems between facilities, such as between the metrology tool/facility 206 and the fab tool 422. Such integration enables facilities to coordinate their activities. For example, integrating the metrology tool 206 and the fab tool 422 may enable manufacturing information to be incorporated more efficiently into the fabrication process, and may enable wafer data from the metrology tools to be returned to the fab tool 422 for improvement and incorporation.

The above described method and system only serve as examples. The above method and system may be extended and modified and may include proper variations, embodiments, and alternatives without departure of the spirit of the invention. For example, the thermal furnace may be a batch processing tool designed for thermal oxidation or annealing. The predictable wafer results may include other parameters such as film resistance or film reflectivity. In another embodiment, the batch wafer result prediction model may combine the optimal curve fitting and the partial least square fitting such that a wafer parameter can be predicted partially based on the batch processing tool data and partially based on the batch processing product data. In one example, the silicon nitride film thickness of wafers processed by the thermal furnace 300 in batch can be predicted by measuring the film thickness at the optimal sampling points for a first period of time and then predicted by collecting hardware key parameters of the thermal furnace 300 for a second period of time or the same first period. The discrepancy between the two prediction method may be used to initiate the method 100 to tune and adjust the batch wafer result prediction model 402.

Thus, the present disclosure provides a method to enable wafer result prediction from a batch processing tool. The method includes collecting manufacturing data from a batch of wafers processed in batch in the batch processing tool, to form a batch processing result; defining a degree of freedom of the batch processing result based on the manufacturing data; and performing an optimal curve fitting by trial and error for an optimal function model of the batch processing result based on the batch processing result.

In the disclosed method, the manufacturing data may include batch processing product data collected from metrology tool; and batch processing tool data collected from the batching processing tool. The method may further include performing partial least square fitting to form a correlation equation between batch processing product data and processing tool data. The method may further include combining the optimal function model and the correlation equation into a batch product result prediction model. The defining of a degree of freedom may include finding eigenvalues and eigenfunctions of a matrix associated with the batch processing product data. The performing of an optimal curve fitting may include utilizing a piecewise curve fitting. The method may further include selecting optimal sampling points based on the degree of freedom, the optimal function model and the batching processing product data. The batching processing tool may include a thermal furnace. The batching processing tool may be designed for a wafer process selected from the group consisting of silicon nitride deposition, thermal silicon oxide, and thermal annealing.

The present disclosure also provide another embodiment of a method to enable wafer result prediction associated with a batch processing tool. The method includes collecting manufacturing data from a batch of wafers processed in batch in the batch processing tool, wherein the manufacturing data include batch processing product data and batch processing tool data; defining a degree of freedom of the batch processing product result based on the batch processing product data; performing an optimal curve fitting by trial and error for an optimal function model of the batch processing result based on the batch processing product data; selecting optimal sampling points based on the degree of freedom, the optimal function model and the batching processing product data; and performing partial least square fitting to form a correlation equation between batch processing product data and processing tool data.

The disclosed method may further include comprising combining the optimal function model and the correlation equation into a batch product result prediction model. The disclosed method may have various embodiments. For examples, the batch product prediction model is adaptive for dynamic tuning during manufacturing new products by the batch processing tool. The method further includes comprising predicting batch wafer results for new wafers processed by the batch processing tool using the batch result prediction model. The predicting of batch wafer results includes predicting a product parameter. The predicting of a product parameter further includes predicting a film thickness. The defining of a degree of freedom includes finding eigenvalues and eigenfunctions of a matrix associated with the batch processing product data. The performing of the optimal curve fitting includes utilizing a piecewise curve fitting.

The present disclosure also provides a semiconductor batch result prediction system. The system includes a data collector designed for collecting manufacturing data, the manufacturing data including batch processing tool data associated a batch processing tool and batch processing product data associated with a batch of wafers processed by the batch processing tool; an optimal curve fitting module designed for generating an optimal function model based on the batch processing product data; and a partial least square fit (PLSF) module designed for generating a correlation equation between the batch processing product data and the batch processing tool data.

The system may further include a degree of freedom (DF) module for defining the DF of a product parameter associated with the batch processing product data. The system may further include a batch result prediction module for predicting batch wafer result processed in the batch processing tool based on a combination of the optimal function model and the correlation equation.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. A method to enable wafer result prediction from a batch processing tool, comprising:
    collecting manufacturing data from a batch of wafers processed in batch in the batch processing tool, to form a batch processing result, the manufacturing data including product data and tool data;
    defining a degree of freedom of the batch processing result, wherein defining the degree of freedom includes forming a parameter matrix associated with a product parameter from the product data, and calculating the degree of freedom based on the parameter matrix;
    creating an optimal function model of the batch processing result, wherein creating the optimal function model includes using the product data to determine a number of model parameters, wherein the model parameters are related to hardware parameters from the tool data, and wherein the number of the model parameters is associated with the degree of freedom;
    selecting optimum sampling points based on the degree of freedom and the optimal function model;

forming a correlation equation based on the product data and the tool data;

forming a batch wafer result prediction model of the batch processing result, wherein forming the batch wafer result prediction model includes combining the optimal functional model and the correlation equation; and predicting batch wafer results from the batch processing tool using the wafer result prediction model.

2. The method of claim 1 further comprising collecting the product data from one or more metrology tools.

3. The method of claim 1 wherein creating the optimal function model is performed automatically, and is based on one or both of measured product results and a user's input.

4. The method of claim 1 wherein the product data is collected and averaged for multiple batches processed on the same batch processing tool.

5. The method of claim 1, wherein defining the degree of freedom comprises finding eigenvalues and eigenfunctions of the parameter matrix.

6. The method of claim 1, wherein predicting the batch wafer results comprises predicting a product parameter.

7. A method to enable wafer result prediction from a batch processing tool, comprising:

collecting manufacturing data from a plurality of wafers processed in the batch processing tool, wherein the manufacturing data include product data taken from a plurality of locations on each wafer, and tool data;

defining a degree of freedom based on a product parameter matrix associated with a product parameter from the product data;

performing an optimal curve fitting by trial and error for an optimal function model based on the product data, the optimal function model including model parameters related to hardware parameters from the tool data;

selecting optimal sampling points based on the degree of freedom, the optimal function model, and the product data;

performing partial least square fitting to form a correlation equation between the product data and the tool data;

combining the optimal function model and the correlation equation into a batch wafer result prediction model; and predicting batch wafer results for another plurality of wafers processed by the batch processing tool using the batch wafer result prediction model.

8. The method of claim 7, wherein the optimum function model is a function of a sequential location number of a wafer in the plurality of wafers.

9. The method of claim 7, wherein the optimum function model utilizes piecewise curve fitting.

10. The method of claim 7, wherein predicting the batch wafer results comprises predicting a product parameter for the second plurality of wafers.

11. The method of claim 10, wherein the batch processing tool is a furnace, and wherein the product parameter is a film thickness.

12. The method of claim 7, wherein defining the degree of freedom comprises finding eigenvalues and eigenfunctions of the parameter matrix.

13. The method of claim 7, wherein the batch product prediction model is adaptive for dynamic tuning during manufacturing new products by the batch processing tool.

14. The method of claim 7, wherein the batching processing tool is designed for a wafer process selected from the group consisting of silicon nitride deposition, thermal silicon oxide, and thermal annealing.

15. A method to enable wafer result prediction from a batch processing tool, comprising:

collecting manufacturing data from a batch of wafers processed in batch in the batch processing tool, to form a batch processing result, the manufacturing data including product data and tool data;

defining a degree of freedom of the batch processing result, wherein defining the degree of freedom includes forming a parameter matrix associated with a product parameter from the product data, and calculating the degree of freedom based on the parameter matrix;

creating an optimal function model of the batch processing result by a curve fitting method, wherein creating the optimal function model includes using the product data to determine a number of model parameters, wherein the model parameters are related to hardware parameters from the tool data, and wherein the number of the model parameters is associated with the degree of freedom;

selecting optimum sampling points based on the degree of freedom and the optimal function model;

performing a partial least squares ("PLS") fitting to form a correlation equation between the product data collected from a metrology tool and the tool data collected from the batch processing tool; and predicting wafer results from the batch processing tool based on product data from the optimum sampling points, the tool data, and the correlation equation.

16. The method of claim 15, further comprising:

combining the optimal function model and the correlation equation into a batch product result prediction model.

17. The method of claim 16, wherein the batch product prediction model is adaptive for dynamic tuning during manufacturing new products by the batch processing tool.

18. The method of claim 15, wherein predicting the batch wafer results comprises predicting a product parameter.

19. The method of claim 15, wherein defining the degree of freedom comprises finding eigenvalues and eigenfunctions of the parameter matrix.

20. The method of claim 15 wherein the optimum function model is based on product data and tool data, from more than one batch.

* * * * *